(12) United States Patent
Watanabe et al.

(10) Patent No.: US 7,774,544 B1
(45) Date of Patent: Aug. 10, 2010

(54) RELIABLE DISK OWNERSHIP CHANGES

(75) Inventors: Steven Watanabe, San Jose, CA (US); Susan Coatney, Cupertino, CA (US)

(73) Assignee: NetApp, Inc., Sunnyvale CA ( * ) Notice: Subject to any disclaimer, the term of this patent is extended or adjusted under 35 U.S.C. 154(b) by 898 days.

(21) Appl. No.: 11/600,582

(22) Filed: Nov. 15, 2006

(51) Int. Cl.
*G06F 11/30* (2006.01)
*G06F 17/40* (2006.01)
*G06F 11/00* (2006.01)
*G06F 15/173* (2006.01)
*G06F 15/16* (2006.01)
*G06F 13/00* (2006.01)
*G06F 13/28* (2006.01)
*G21C 17/00* (2006.01)

(52) U.S. Cl. ........................ 711/114; 702/182; 702/183; 702/184; 702/185; 702/186; 702/187; 702/188; 709/226; 709/229; 711/111; 711/141; 711/147; 714/4

(58) Field of Classification Search ............ 714/4; 709/226, 229; 710/14, 15; 711/141, 147; 702/182–188
See application file for complete search history.

(56) References Cited

U.S. PATENT DOCUMENTS

| | | | | |
|---|---|---|---|---|
| 5,920,622 A | * | 7/1999 | Erb et al. | 379/204.01 |
| 5,987,621 A | * | 11/1999 | Duso et al. | 714/4 |
| 6,044,335 A | * | 3/2000 | Ksendzov | 702/182 |
| 6,078,990 A | * | 6/2000 | Frazier | 711/114 |
| 6,343,338 B1 | * | 1/2002 | Reneris | 710/200 |
| 6,594,698 B1 | * | 7/2003 | Chow et al. | 709/226 |
| 6,748,510 B1 | | 6/2004 | Coatney | |
| 6,839,896 B2 | | 1/2005 | Coffman et al. | |
| 7,013,419 B2 | | 3/2006 | Kagan et al. | |
| 7,039,663 B1 | | 5/2006 | Federwisch et al. | |
| 7,260,678 B1 | * | 8/2007 | Agarwal et al. | 711/112 |
| 7,293,195 B1 | * | 11/2007 | Watanabe et al. | 714/9 |
| 2001/0039550 A1 | * | 11/2001 | Putzolu | 707/205 |
| 2001/0049740 A1 | | 12/2001 | Karpoff | |
| 2003/0108070 A1 | | 6/2003 | Zauman et al. | |
| 2003/0120743 A1 | * | 6/2003 | Coatney et al. | 709/217 |
| 2004/0054849 A1 | * | 3/2004 | Deenadhayalan et al. | 711/112 |
| 2004/0186844 A1 | | 9/2004 | Muhlestein | |
| 2004/0199607 A1 | | 10/2004 | Reger et al. | |
| 2005/0144310 A1 | | 6/2005 | Biran et al. | |
| 2005/0177764 A1 | | 8/2005 | Cassell et al. | |
| 2005/0177770 A1 | | 8/2005 | Coatney et al. | |
| 2005/0278382 A1 | | 12/2005 | LaRocca et al. | |

(Continued)

OTHER PUBLICATIONS

US 6,988,220, 01/2006, Eng et al. (withdrawn)

*Primary Examiner*—Robert Beausoliel
*Assistant Examiner*—Jeison C Arcos
(74) *Attorney, Agent, or Firm*—Perkins Coie LLP

(57) ABSTRACT

In an embodiment of the invention, a method and apparatus permits the reliable disk ownership changes. The method and apparatus generate a replay request based on ownership data stored in a persistent memory device, in response to a failure occurrence when ownership is being changed for disks in an aggregate. The method and apparatus will compare an update count in the replay request with an update count in a disk in the aggregate. Based on the comparison of the update count, the ownership on the disk is changed so that each disk in the aggregate will be owned by a same node. The failure occurrence can be, for example, a power failure, a panic occurrence, or a takeover procedure.

46 Claims, 10 Drawing Sheets

U.S. PATENT DOCUMENTS

| | | |
|---|---|---|
| 2005/0278383 A1 | 12/2005 | Kazar et al. |
| 2006/0074925 A1* | 4/2006 | Bixby et al. ................ 707/100 |
| 2006/0075067 A1 | 4/2006 | Blackmore et al. |
| 2008/0022058 A1* | 1/2008 | Nadathur et al. ............ 711/162 |
| 2009/0070337 A1* | 3/2009 | Romem et al. ................ 707/10 |

* cited by examiner

RELIABLE DISK OWNERSHIP CHANGES

TECHNICAL FIELD

Embodiments of the invention relate generally to data storage technology, and more particularly to disk ownership in networked file servers.

BACKGROUND

A filer (i.e., file server) is a computer that provides file services relating to the organization or storage of information on storage devices such as, for example, disks. The filer includes a storage operating system that implements a file system to logically organize the information as a hierarchical structure of directories and files on the disks. Each file on a disk may be implemented as a set of data structures, e.g., disk blocks, which are configured to store information. A directory may be implemented as a formatted file in which information by other files and directories is stored.

A filer may be further configured to operate according to a client/server model of information delivery in order to allow many clients to access files stored on a server. In this model, the client may include an application, such as a database application that executes on a computer that connects to the filer over a computer network. This computer network could be, for example, a point to point link, a shared local area network (LAN), a wide area network (WAN), a virtual private network (VPN) implemented over a public network such as the Internet, or other suitable networks. Each client may request the services of the file system on the filer by issuing file system protocol messages (typically in the form of packets) to the filer over the network.

An implemented disk storage typically has one or more storage "volumes" which are a collection of physical storage disks and which define an overall logical arrangement of storage space. A storage volume can also be referred to as an "aggregate". In other words, a storage volume is a logical container that includes a collection of disks. Therefore, the collection of disks are grouped (assimilated) into the storage volume. Each volume is generally associated with a file system. The disks within a volume/file system are typically organized as one or more groups of Redundant Array of Independent (or Inexpensive) Disks (RAID). As known to those skilled in the art, RAID implementations enhance the reliability and integrity of data storage through the redundant writing of data stripes across a given number of physical disks in the RAID group, and the appropriate caching of parity information with respect to the striped data. In the example of a WAFL (write-anywhere-file-layout) based file system and process, a RAID 4 implementation is advantageously employed. This implementation specifically entails the striping of data across a group of disks, and separate parity caching within a selected disk of the RAID 4 group. Other RAID implementations, such as e.g., RAID-DP from Network Appliance, Inc., are also advantageously employed.

Each filer will service one or more storage volumes. A filer is deemed to be an "owner" of the disks that belong in a volume that is serviced by the filer. The filer is responsible for servicing the data contained on those disks owned by the filer. Typically, only the filer that owns a particular disk should be able to write data to that disk. This solo ownership requirement helps to ensure data integrity and coherency. An ownership will change for a disk when the disk ownership changes from a first filer to another filer or device.

Currently-known approaches provide no mechanisms for protecting the ownership changes of a set of disks if a failure should occur during the ownership change procedure. The failures could be as a result of, for example, power failure in the system, takeover (i.e., failover procedure), or panic (i.e., action taken by a software, such as displaying an error message, freezing, or automatically rebooting, when a serious problem makes the software unable to run), or other types of failures that prevent the successful completion of the ownership change procedure. As a result of a failure, a subset of the disks in an aggregate may reflect a new ownership while another subset of the disks in the same aggregate would still contain the old ownership information. Therefore, a subset of disks with the new ownership will be owned by one particular filer and the other subset of disks with the old ownership information will be owned by another filer. Neither the new owner nor the old owner will be able to assimilate the disks into the aggregate (i.e., storage volume) because different ownership information are contained in the disks. Current approaches do not provide an automated method for preventing an aggregate from having disks with different owners, if failure occurs when ownership is being modified for the disks.

Therefore, the current technology is limited in its capabilities and suffers from at least the above constraints and deficiencies.

SUMMARY OF EMBODIMENTS OF THE INVENTION

In an embodiment of the invention, a method and apparatus permits the reliable disk ownership changes. The method and apparatus generate a replay request based on ownership data stored in a persistent memory device, in response to a failure occurrence when ownership is being changed for disks in an aggregate. A replay request will contain the same information as an ownership assignment request. An ownership assignment request is sent by, for example, a filer to a disk in order to write the ownership information to the disk. The replay request is a re-transmission of an ownership assignment request to the disk. The replay request is transmitted to the disks in the aggregate (e.g., storage volume) in response to a failure occurrence when ownership is being changed for a disk in the aggregate. However, a replay request flag is set in a replay request, while the replay request flag is not set in an ownership assignment request. The method and apparatus compares an update count in the replay request with an update count in a disk in the aggregate. The update count in the replay request has the same value as an update count of a previous ownership assignment request that was being transmitted to change the ownership of disks in the aggregate when the failure occurred. Based on the comparison of the update count, the method and apparatus will change the ownership on a disk (or will not change the ownership on a disk) so that each disk in the aggregate will be owned by a same node. For example, if the update count in the replay request and the update count in a disk are equal in value, the method and apparatus will change the ownership on a particular disk to reflect the new owner of the disk. The failure occurrence can be, for example, a power failure, a panic occurrence, or a takeover procedure.

These and other features of an embodiment of the present invention will be readily apparent to persons of ordinary skill in the art upon reading the entirety of this disclosure, which includes the accompanying drawings and claims.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION OF PREFERRED EMBODIMENTS

In the description herein, numerous specific details are provided, such as examples of components and/or methods, to provide a thorough understanding of embodiments of the invention. One skilled in the relevant art will recognize, however, that an embodiment of the invention can be practiced without one or more of the specific details, or with other apparatus, systems, methods, components, materials, parts, and/or the like. In other instances, well-known structures, materials, or operations are not shown or described in detail to avoid obscuring aspects of embodiments of the invention.

Figure 1:
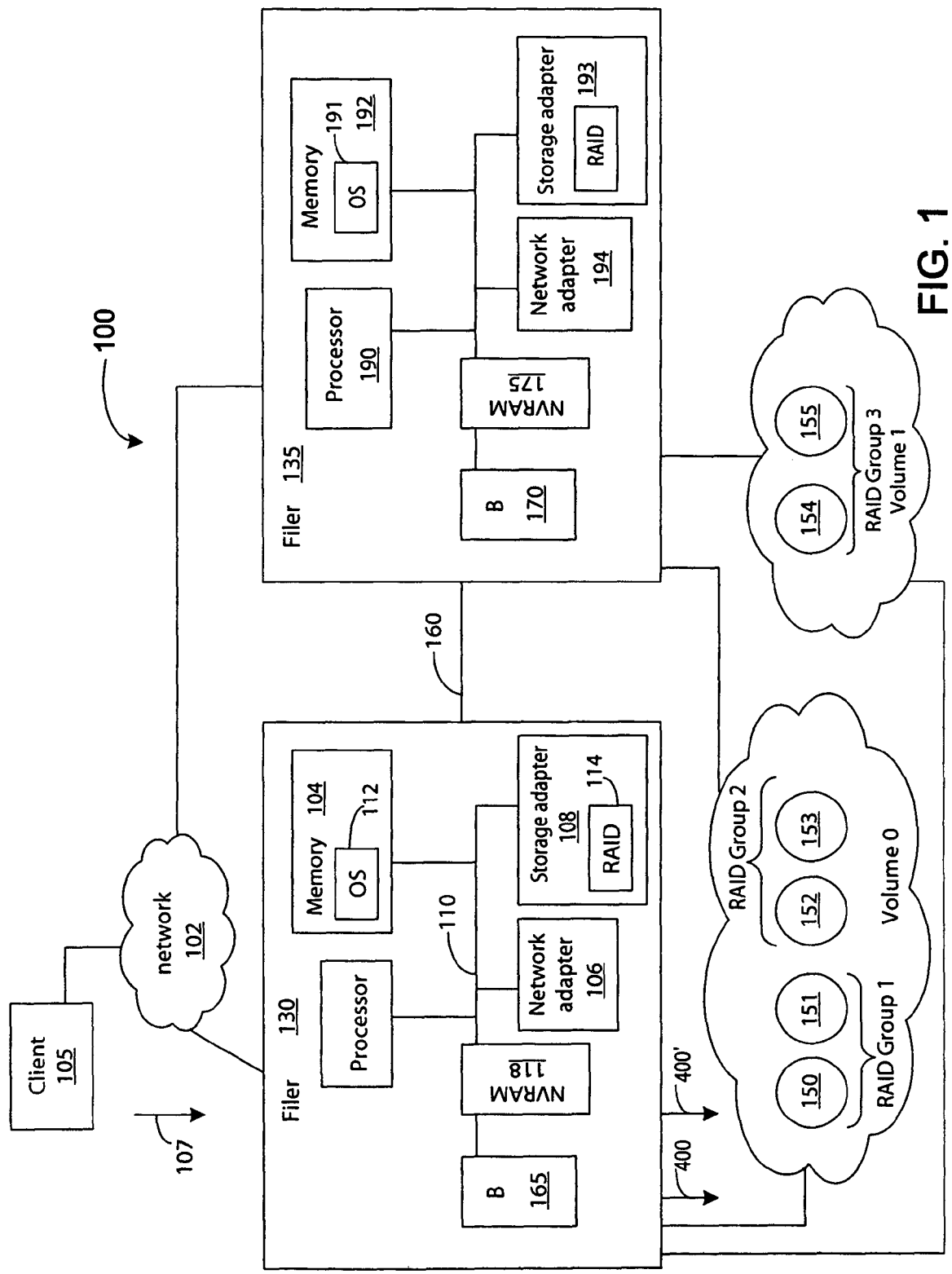
FIG. 1 is a block diagram of a system (apparatus), in accordance with an embodiment of the invention.

FIG. 1 is a block diagram of an apparatus 100, in accordance with an embodiment of the invention. The apparatus 100 includes a network 102 which may be, for example, a local area network (LAN), a wide area network (WAN), virtual private network (VPN), a combination of LAN, WAN and VPM implementations, or another suitable communication network. For the purposes of this description, the term network should be taken broadly to include any acceptable networking architecture. A client 105 and filers 130 and 135 are each connected to the network 102. Additional clients and filers (not shown in FIG. 1) may also be optionally connected to the network 102. Various other devices may also be optionally connected to the network 102 such as, for example, servers, network caches, switches, routers, and/or other suitable devices. As known to those skilled in the art, a switch or router provides a gateway to a wide area network such as the Internet and permits network devices to transmit and receive Internet based information, including e-mail, web content, and the like. Each of the devices attached to the network 102 typically includes an appropriate conventional network interface arrangement (not shown) for communicating over the network 102 using a desired communication protocol such as, for example, Transport Control Protocol/Internet Protocol (TCP/IP), User Datagram Protocol (UDP), Hypertext Transfer Protocol (HTTP), Simple Network Management Protocol (SNMP), or other suitable protocols.

A filer is a computer that provides file service relating to the organization or storage of information on storage devices, such as disks. Examples of currently available filer products and associated software components are commercially available from, for example, NETWORK APPLIANCE, INC., Sunnyvale, Calif. or other vendors. In addition, it will be understood to those skilled in the art that the embodiments of the invention described herein may also apply to any type of special-purpose computer (e.g., server) or general-purpose computer, including a stand-alone computer, embodied as a file server. Moreover, the teachings of the embodiments of the invention can also be adapted to a variety of file server architectures including, but not limited to, a network-attached storage environment, or a storage area network and disk assembly directly-attached to a client/host computer. The term "filer" or "file server" should therefore be taken broadly to include such arrangements.

The filer 130 includes a processor 103, a memory 104, a network adapter 106 and a storage adapter 108 interconnected by a system bus 110. The filer 130 also includes a storage operating system 112 that implements a file system to logically organize the information as a hierarchical structure of directories and files on a disk. Additionally, a persistent storage device 118 such as, for example, a non-volatile RAM (NVRAM) 118 is also connected to the system bus 110. Although NVRAMs are shown in FIG. 1, any suitable persistent storage device that retains content in the event of a power failure or other system failure can be used in place of the NVRAMs. An example of a suitable persistent storage device is a battery-backed RAM, although other suitable storage devices may also be used. The functions of the NVRAM 118 are described in additional details below.

In an illustrative embodiment, the memory 104 may have storage locations that are addressable by the processor 103 for storing software program code or data structures for use in the functions of the filer 130. The processor 103 and adapters 106 and 108 may, in turn, include processing elements and/or logic circuitry configured to execute the software code and manipulate the data structures.

The storage operating system 112, portions of which are typically resident in memory 104 and executed by the processing elements, functionally organizes a filer by inter-alia invoking storage operations in support of the file services that are implemented by the filer. It will be apparent by those skilled in the art that other processing and memory implementations, including various computer readable media may be used for storing and executing program instructions pertaining to the inventive techniques described herein.

The network adapter 106 includes the mechanical, electrical, and signaling circuitry for connecting the filer 130 to a client 105 over the computer network 102 or connecting the filer 130 to one or more filers 135. A client 105 can be a general-purpose computer configured to execute applications including file system protocols such as, for example, the Network File System (NFS) or the Common Internet File System (CIFS) protocol or other suitable protocols. Moreover, the client 105 can interact with the filer 130 in accordance with the known client/server model of information delivery.

The storage adapter 108 cooperates with the storage operating system 112 in order to access information requested by the client 105. The information may be stored in a number of storage volumes (e.g., Volume 0 and Volume 1). The number of storage volumes may vary. Each storage volume is constructed from an array of physical disks that are typically organized as RAID groups. The RAID groups include independent physical disks including those storing a striped data and those storing separate parity data. The number of disks in a storage volume and in a RAID group may vary. The number of RAID groups in a storage volume may also vary. In the example of FIG. 1, disks 150-153 form storage volume 0, while disks 154-155 form storage volume 1. Disks 150-151 form RAID group 1, disks 152-153 form RAID group 2, and disks 154-155 form RAID group 3. RAID groups 1 and 2 are in Volume 0, and RAID group 3 is in Volume 1. A storage volume can also be referred to an "aggregate".

The storage adapter 108 includes input/output interface circuitry that couples to the disks over an I/O interconnect arrangement such as, for example, a conventional high-speed/high-performance fibre channel serial link topology. The information is retrieved by the storage adapter 108, and may be processed by the processor 103 (or the adapter 108 itself) prior to being forwarded over the system bus 110 to the network adapter 106, where the information is formatted into a packet and returned to the client 105.

To facilitate access to the disks, the storage operating system 112 typically implements a file system that logically organizes the information as a hierarchical structure of directories in files on the disks. Each file on a disk may be implemented as a set of disk blocks configured to store information such as text or other format. The directory may be implemented as a formatted file in which other files and directories are stored. The storage operating system 112 associated with each volume is, for example, the Data ONTAP® storage operating system which is commercially available from NETWORK APPLIANCE, INC. The Data ONTAP storage operating system implements a Write Anywhere File Layout (WAFL)® file system. However, it is expressly contemplated that the principles of embodiments of this invention can be implemented using a variety of alternate storage operating system architectures. Additional details on the functions of the storage operating system 112 is disclosed in, for example, commonly-assigned U.S. patent application Ser. No. 10/027,457, by Susan Coatney et al., entitled "SYSTEM AND METHOD OF IMPLEMENTING DISK OWNERSHIP IN NETWORKED STORAGE", which is hereby fully incorporated herein by reference.

The second filer 135 also includes the above-described similar components of a processor 190, memory 192, storage operating system 191, storage adapter 193, network adapter 194, and a persistent storage device 175 such as an NVRAM. The filer 130 and filer 135 are connected by a link 160. As an example, the link 160 is an RDMA (Remote Direct Memory Access) interconnect, although other types of links may be used as well in embodiments of the invention. As known to those skilled in the art, RDMA is a technology that allows computers in a network to exchange data in main memory without involving the processor, cache, or operating system of either computer.

As discussed in further details below, the system 100 uses software based disk ownership, where the ownership information is written to each disk by use of ownership assignment requests 400 (FIG. 1 and FIG. 4) or by use of replay requests 400' (FIG. 1 and FIG. 6) after a failure occurrence. A replay request will contain the same information as an ownership assignment request. An ownership assignment request is sent by, for example, a filer to a disk in order to write the ownership information to the disk. The replay request is a re-transmission of an ownership assignment request to the disk. The replay request is transmitted to the disks in the aggregate (e.g., storage volume) in response to a failure occurrence when ownership is being changed for a disk in the aggregate. Note that a replay request 400' and an ownership assignment request 400 have the same data layout. However, the replay request flag 430 is set in a replay request 400', while the replay request flag 430 is not set in an ownership assignment request 400. An overview of the steps performed in accordance with an embodiment of the invention is discussed below with reference to FIG. 2B.

A set of disks is assimilated (grouped) into a storage aggregate (i.e., storage volume) with each disk containing the ownership information. Various methods for assimilating a set of disks into storage volumes are well known to those skilled in the art. Each filer will service one or more storage volumes. A filer is deemed to be an "owner" of the disks that belong in a volume that is serviced by the filer. The filer is responsible for servicing the data contained on those disks owned by the filer. Typically, only the filer that owns a particular disk should be able to write data to that disk. This solo ownership requirement helps to ensure data integrity and coherency. An ownership will change for a disk when the disk ownership changes from a first filer to a second filer. Therefore, when the second filer becomes the new owner of a disk, only the second filer can write to the disk and the first filer will no longer be able to write to the disk.

A user can use the client device 105 to change the ownership of disks in a storage aggregate. The ownership can change from a first filer to a second filer. When the user uses the client device 105 to initiate an ownership change, the client device 105 sends, for example, a standard command 107 to the filer 130. In response to the command 107, the filer 130 will send an ownership change request 400 to each of the disks (e.g., disks 150-153) in a storage aggregate (e.g., volume 0). The request 400 will change ownership information in each of the disks so that the changed ownership information will then indicate that the new owner of the disks is the filer 135.

A possible advantage of embodiments of the invention is that ownership of a set of disks in a storage aggregate (e.g., a storage volume) can be changed in such a manner that should a failure occur, ownership of all disks in the aggregate will be changed during the recovery procedure after the failure occurrence. This method advantageously prevents the dual-ownership situation. A dual-ownership situation is where one or more disk in the aggregate is owned by a particular node and one or more disk in the same aggregate is owned by a different node. This dual ownership situation of an aggregate prevents the assimilation (grouping) of the disks into the aggregate and prevents services of data (e.g., write or read) in the aggregate. Therefore, embodiments of the invention provide a method and apparatus that automatically assigns the ownership of each disk in an aggregate to the same owner node, if failure or takeover should occur when ownership of the disks is being changed to the new owner.

Figure 2A:
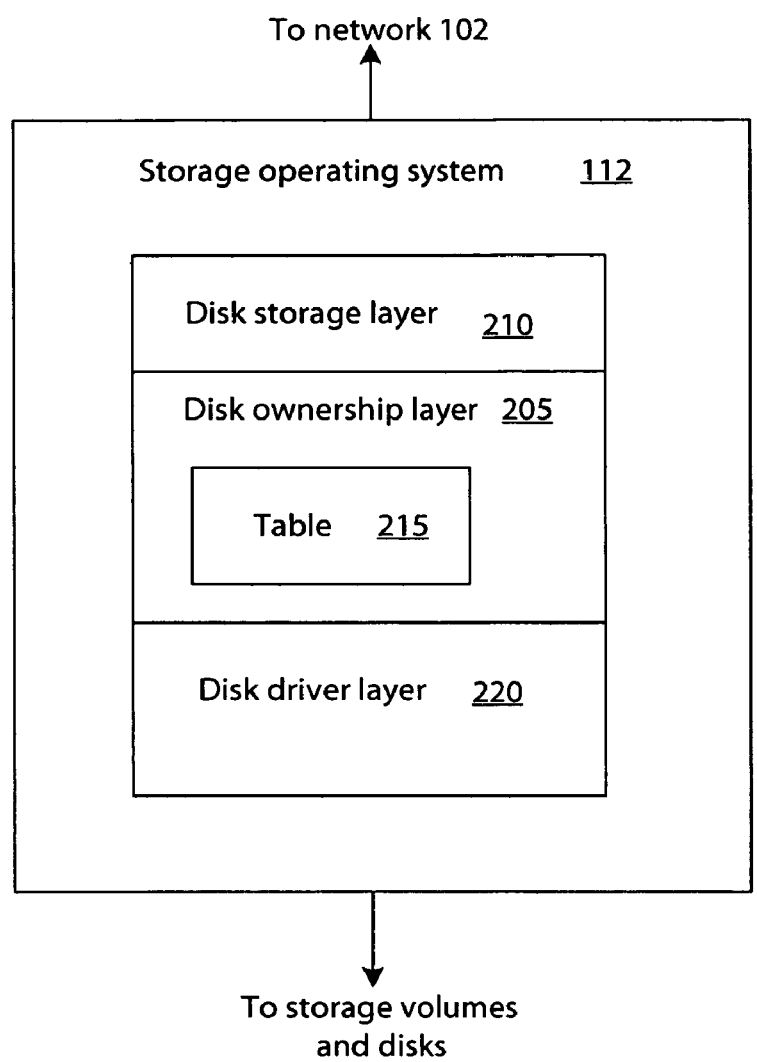
FIG. 2A is a block diagram of a storage operating system that can be used in an embodiment of the invention.

FIG. 2A is a block diagram of a storage operating system 112 that can be used in an embodiment of the invention. The storage operating system 112 includes a disk ownership layer 205 that manages the ownership of the disks to their related node. As an example, the disk ownership layer 205 implements a process for changing disk ownership (e.g., the SANOWN® process) in order to change the ownership of a disk from a first owner node to a second owner node. The SANOWN process is implemented in filer products which are commercially available from NETWORK APPLIANCE, INC.

A disk ownership layer 205 is typically in the disk storage layer 210 in the operating system 112. Example functions of the disk ownership layer 205 are described in the above-referenced U.S. patent application Ser. No. 10/027,457. For purposes of clarity, various logical constructs discussed herein (e.g., OS 112 and layers 210, 205, and 220) are described herein as performing various steps. In an implementation, various processes in the logical constructs will actually perform the various steps. The disk ownership layer 205 includes program instructions for writing the proper ownership information for a disk to, for example, the sector S or/and other locations on the disk.

The disk ownership layer 205 may also include a disk table 215 that contains disk ownership information. This disk ownership information indicates which disks are owned by which particular filer or node. This disk table 215 is typically generated at boot-up of a filer, and is updated by the various components of the storage operating system 112 to reflect changes in ownership of disks.

The disk ownership layer 205 extracts from the disk ownership table 215 the identification of all disks that are owned by any particular filer in the system 100. Additionally, the disk ownership layer 205 updates the disk ownership table 215 during the operation of the filer. When the disk topology changes, the firmware in the switches (connected to the disks) report the ownership changes to the filers by use of, for example, topology updates or other messages. Methods of notifying a filer of topology changes are described in, for example, the above-referenced commonly-assigned U.S. patent application Ser. No. 10/027,457 The filers then update their respective disk ownership tables 215.

The disk driver layer 220 in the storage operating system 112 queries all devices attached to the storage adapter 114 of each node. This query requests information as to the nature or characteristics of the device attached. Upon the completion of the query, the disk ownership layer 205 instructs the disk driver layer 220 to read the ownership information from each disk drive. The disk driver layer 220 reads the ownership information from each physical disk drive identified. The disk ownership layer then creates the ownership table 215.

The storage operating system 112 also includes other layers as described in the above-referenced U.S. patent application Ser. No. 10/027,457.

Figure 2B:
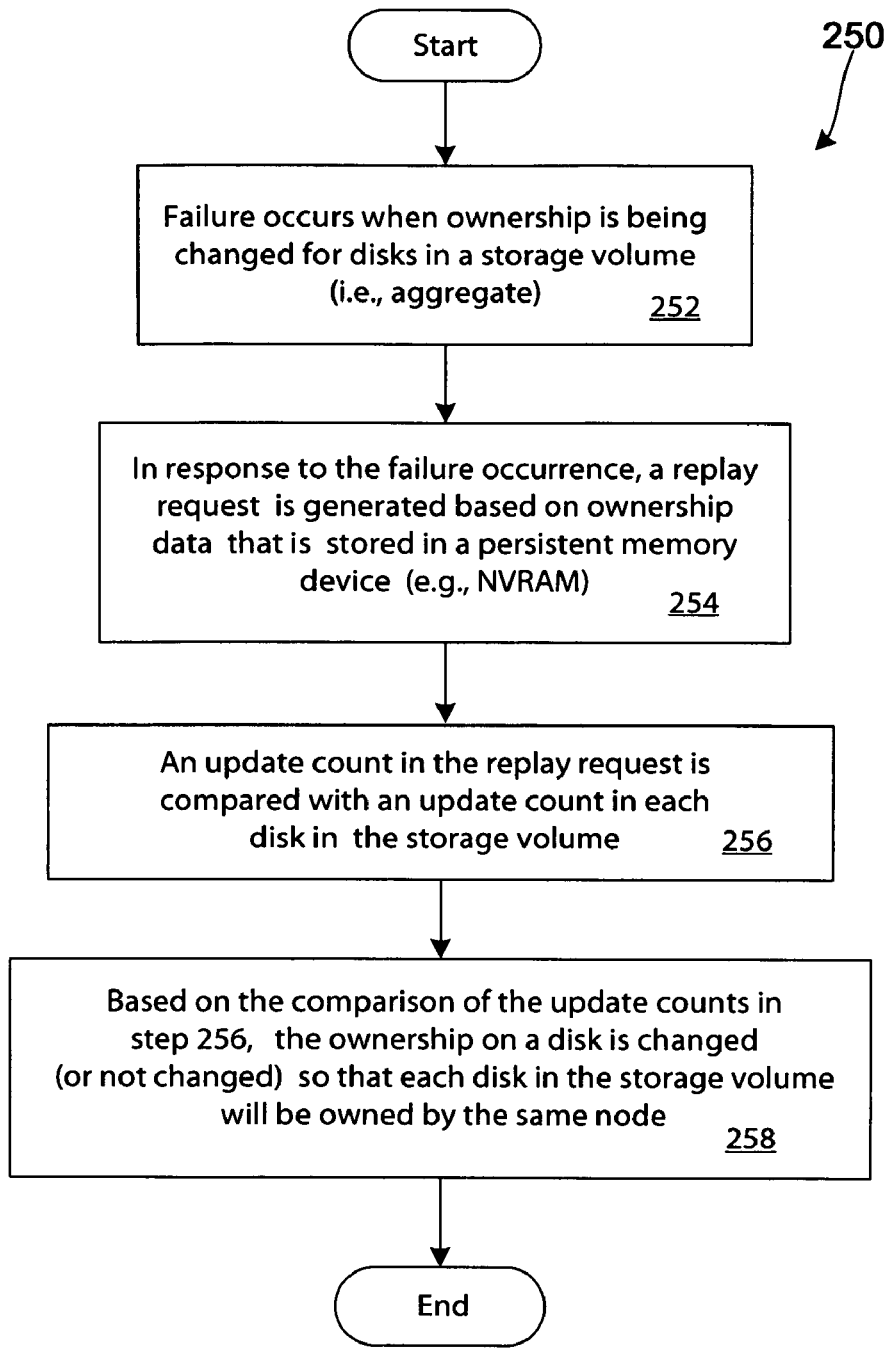
FIG. 2B is a flow diagram of a method in accordance with an embodiment of the invention.

FIG. 2B is a flow diagram of a method 250 in accordance with an embodiment of the invention. The method 250 permits the completion of a change in the ownership on all disks in a storage volume (i.e., an aggregate) so that all disks in the storage volume will be owned by the same owner node, if a failure occurs during the disk ownership change process. The steps 252-258 of method 250 can be performed by the disk ownership layer 205.

In step 252, assume that a failure occurs when ownership is being changed for disks in a storage volume (e.g., volume 0 in FIG. 1), such that the ownership change is not performed for all disks in the storage volume. A failure occurrence can be, for example, a power failure, a panic occurrence, or a takeover procedure. The storage operating system 112 can detect a failure occurrence by use of methods that are known to those skilled in the art.

In step 254, due to the failure occurrence when ownership is being changed for disks in a storage volume, not all disks in the storage volume will belong to the same owner. For example, the failure occurrence prevents an ownership assignment request 400 (FIG. 4) to change an ownership of one or more disks 500 (FIG. 5) in the storage volume. In step 254, in response to the failure occurrence, a replay request 400' (FIG. 6) is generated based on ownership data that is stored in a persistent memory device (e.g., NVRAM 118). The disk ownership layer 205 can generate the replay request 400' which is described below in additional details. The details of a replay request 400' are shown in the data layout of FIG. 6. The stored ownership data on which the replay request is based upon is the ownership data of a previous ownership assignment request that was being transmitted to change the ownership of all disks in a storage volume when the failure occurred. The replay request is based upon this previous ownership assignment request. Therefore, the replay request will have an update count with the same value as an update count of this previous ownership assignment request. An update count 420 in an ownership assignment request is illustrated, for example, in FIG. 4. An update count 420 is logged as an update count 630 (FIG. 6) into the NVRAM 118, and is used as the update count for a replay request 400 if failure occurs when the ownership assignment request is in the process of changing ownership of disks in a storage volume. As an example, an update count can be a counter value in a counter that is controlled by the disk ownership layer 205. The update count can be incremented and be reset by the disk ownership layer 205.

Figure 5:
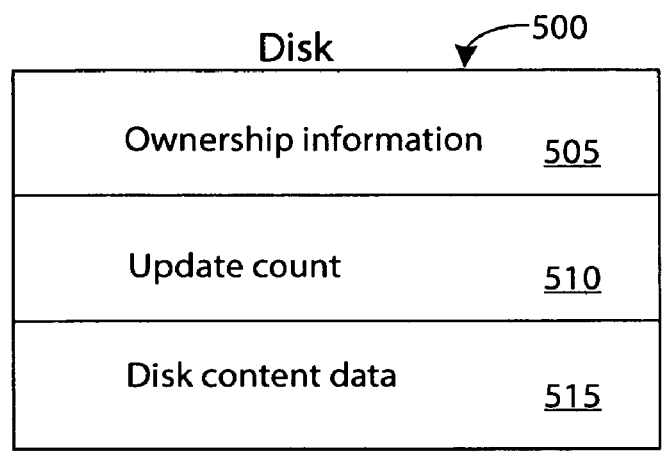
FIG. 5 is a block diagram of an example disk, in accordance with an embodiment of the invention.

In step 256, an update count in the replay request is compared with each update count in each disk in the storage volume. An update count 510 in a disk 500 is illustrated in FIG. 5. An update count 510 is, for example, incremented by 1 (one) whenever an ownership of a disk 500 is changed.

In step 258, based on the comparison of the update counts as performed in step 256, the ownership on a disk is changed (or not changed) so that each disk in the storage volume will be owned by a same node. For example, assume that the update count in the replay request has a value of 6 (six). This update count in the replay request represents the update count of the previous ownership assignment request that was being transmitted to change disk ownership when the failure occurred. This update count of 6 indicates that the previous ownership assignment request will change the ownership of each disk in the storage volume for the $7^{th}$ time. Note that an update count of 0 indicates the initial ownership of a disk. As mentioned above, a disk will also have its own update count, which indicates the number of times that ownership has been changed for the disk. If a disk in the storage volume has an update count of 6, then the ownership of the disk has only been changed for 6 times, and the failure occurrence prevented the ownership of the disk to be changed for the $7^{th}$ time. Note that the update count of 6 in the previous ownership assignment request requires that the ownership of the disk be changed for the $7^{th}$ time. Since the update count of 6 on the replay request is equal to the update count of 6 on the disk, the ownership of the disk will be changed for the $7^{th}$ time in response to the replay request.

In this same example where the previous ownership assignment request has an update count of 6, assume that another disk in the storage volume instead has an update count 7. Therefore, the disk has been updated for the $7^{th}$ time by the previous ownership assignment request with the update count of 6, even though a failure occurred when the ownership assignment request was being transmitted to change the ownership of the disks. Since the update count of 6 on the replay request is less than the update count of 7 on the disk, the ownership of the disk has already been updated to the $7^{th}$ time by the previous ownership assignment request. Therefore, the current ownership of the disk will remain the same and the update count of the disk remains at 7, and the replay request will not change the current disk ownership. This method 250 uses the update counts comparison step as discussed above for all disks in a storage volume, so that all disks in the storage volume will have the same update count. As a result of having the same update count, the disks in the storage volume will also have same owner node. Additional details that relate to the method 250 are discussed below with reference to FIGS. 3-9.

Figure 3:
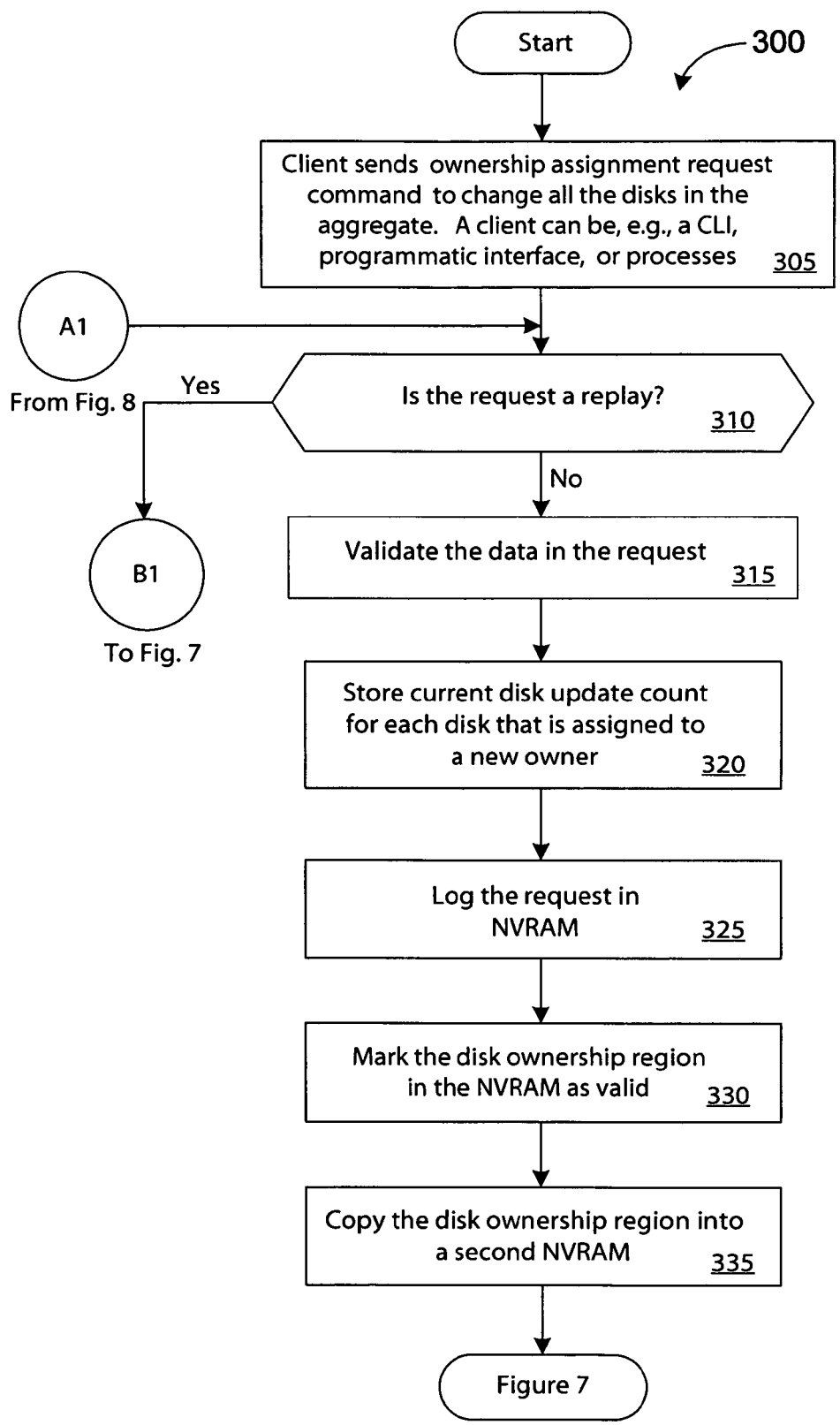
FIG. 3 is a flow diagram showing additional details of a method in accordance with an embodiment of the invention.

FIG. 3 is a flow diagram showing additional details of a method 300 in accordance with an embodiment of the invention. This flow diagram shows the additional details of an automated method for completing a change in the ownership on all disks in a storage volume (i.e., aggregate) so that all disks in the storage volume will be owned by the same owner node, if a failure occurs during the ownership change process.

In step 305, a client 105 sends an ownership assignment request command 107 to the filer 130, and the command 107 is then processed by disk ownership layer 205 (FIG. 2). The disk ownership layer 205 then generates an ownership assignment request (e.g., request 400 in FIG. 4) in response to the command 107. The ownership assignment request is sent for each storage volume that will be assigned to a new owner. An ownership assignment request is sent to each storage volume (disk). Therefore, if five (5) storage volumes will be assigned to a new owner, the filer 130 will send five (5) ownership assignment requests. The client 105 can be, for example, a command line interface (CLI), programmatic interface (e.g., ZAPI), or processes. The ownership assignment request will request that the ownership of disks in a storage volume (e.g., volume 0 or volume 1) be changed from one device (e.g., Filer 130) to another device (e.g., Filer 135). The command 107 can be created by a process operating within a client 105. The process in the disk ownership layer 205 creates an ownership assignment request having an example data structure as represented by block 400 in FIG. 4. The example data structure 400 is discussed in further detail below.

Figure 6:
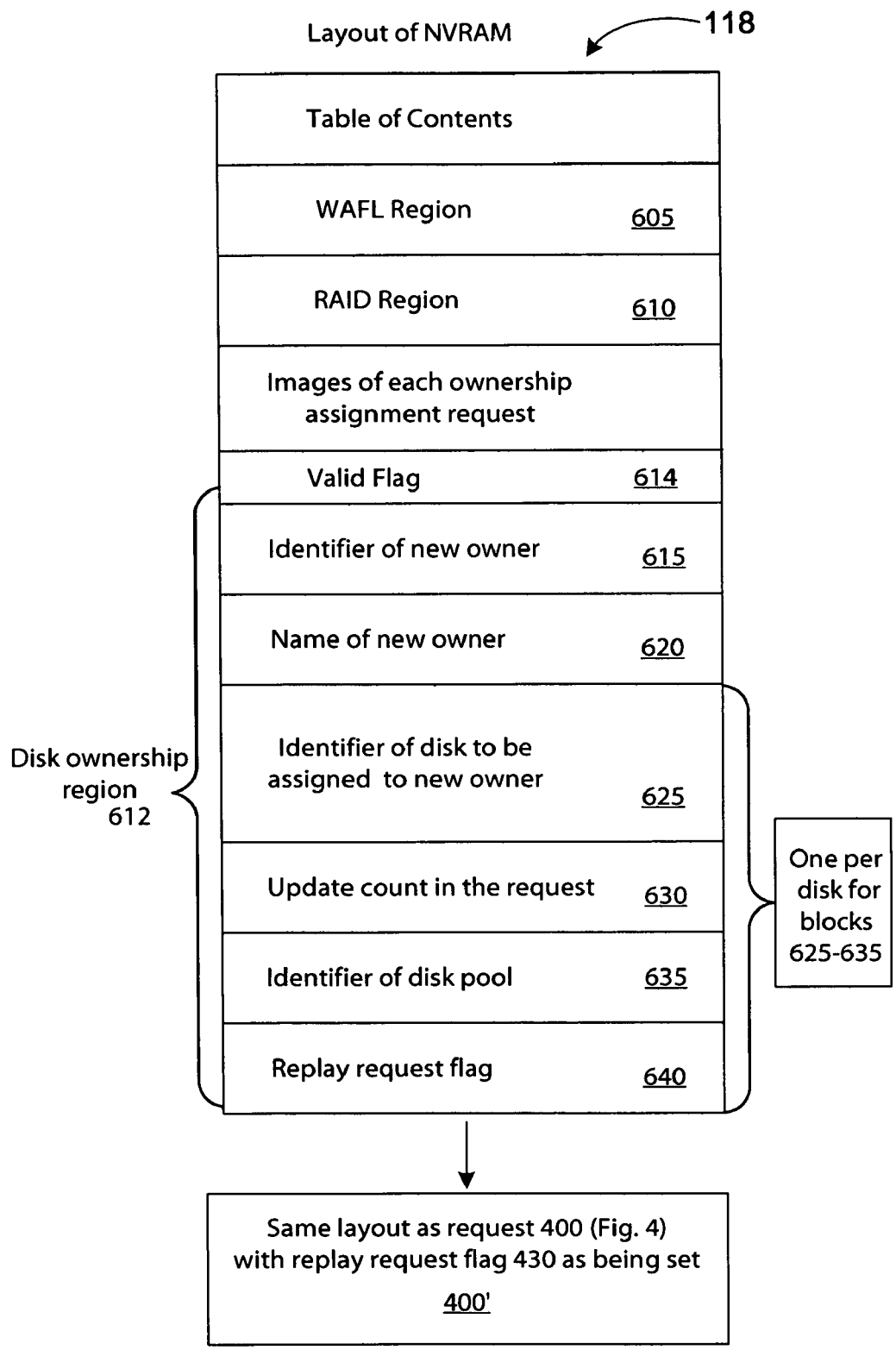
FIG. 6 is a block diagram illustrating additional details of the data in a NVRAM disk ownership entry, in accordance with an embodiment of the invention.

In step 310, the disk ownership layer 205 determines if the ownership assignment request is a replay request 400' (FIG. 6). The details of a replay request were previously discussed above. A replay request is only generated after the occurrence of a failure (e.g., of a Filer 130) or a takeover when disks are being assigned to a new owner, as discussed in further detail below. Therefore, the replay request is not generated if there is not a failure or takeover occurrence. Steps 315-335 are performed if the ownership assignment request is not a replay request.

In step 315, the disk ownership layer 205 validates the ownership assignment request. In this validation step 315, the disk ownership layer 205 determines the storage volume and disks involved in the ownership change. This validation step also includes the disk ownership layer 205 determining the old owner node, and the new owner node, and ensuring the information in the ownership assignment request has valid disk identifiers and pool information.

The disk ownership layer 205 changes the ownership of a disk (e.g., disk 500 in FIG. 5) by changing the ownership information 505 that is stored in the disk 500. When the ownership information is changed (e.g., the disk ownership is changed from Filer 130 to Filer 135), the disk ownership layer 205 will also, for example, increment a disk update count 510 (FIG. 5) in a disk 500 by a value of one. For example, if the disk update count 510 is at a value of 7, then the value 7 indicates that the ownership of the disk 500 has been changed 7 times. After the next ownership change for disk 500, the disk update count 510 will be changed to a value of 8. Note that based on the teachings of the embodiments of the invention as discussed herein, modifications can also be made so that instead of incrementing a disk update count after an ownership change, the disk update count is instead decremented in value.

In step 320 (FIG. 3), the disk ownership layer 205 will store the current disk update count for each disk that is assigned to a new owner, in response to the ownership assignment request from the client 105. The current disk update count 510 is saved as part of the ownership assignment request that is logged into the NVRAM 118. If, on a replay request transmission after a failure occurrence, the update count found on the disk is not the same as this saved current disk update count, then the logged ownership assignment request in NVRAM is "stale" or is no longer up to date. As discussed below, the disk update count 510 in a disk is also used when a failure or takeover occurs in the system 100 during the ownership change process, in order to determine if disk ownership will be changed in response to a replay request.

Figure 4:
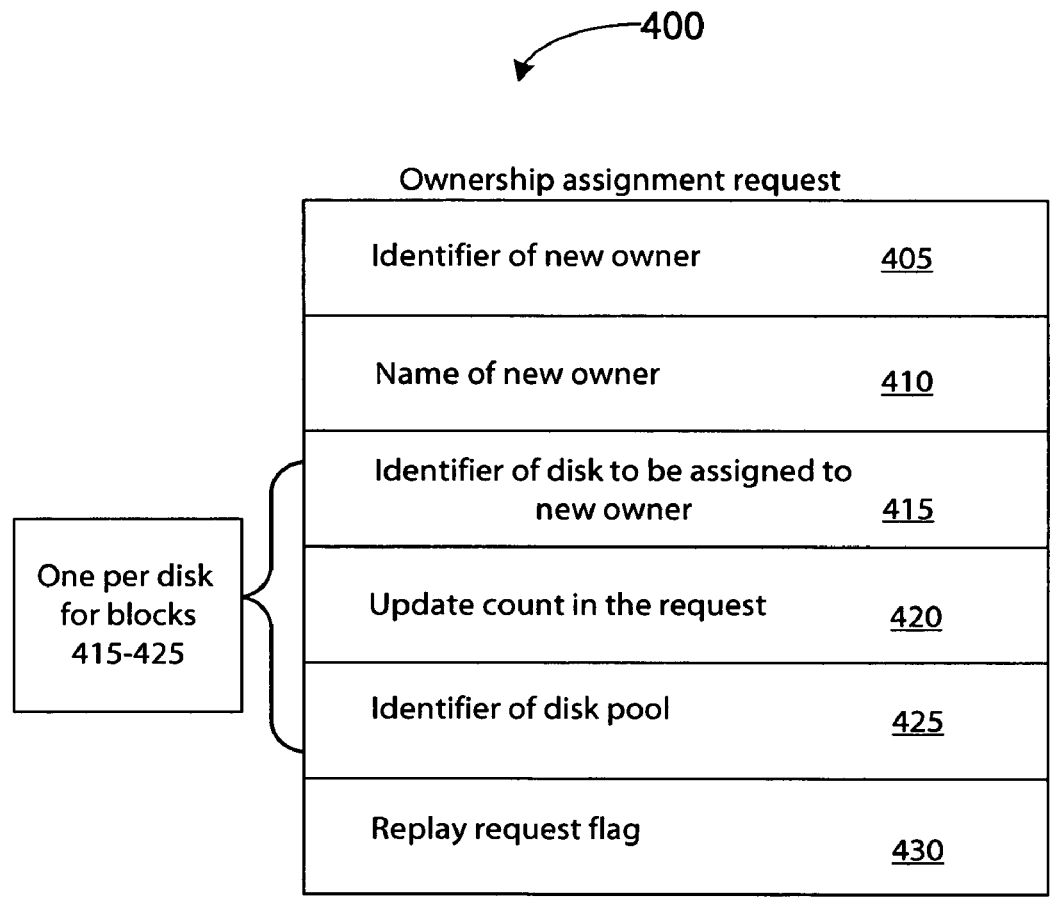
FIG. 4 is a block diagram of an example ownership assignment request, in accordance with an embodiment of the invention.

In step 325, the disk ownership layer 205 logs the ownership assignment request 400 into the NVRAM 118 in filer 130 (FIG. 1). Therefore, the request 400 stored in the NVRAM 118 is an original request and not a replay request. Note that the replay request flag 430 (FIG. 4) in an original request is not set to true (or is set to false or a particular flag value such as, e.g., "0"). In an embodiment of the invention, the ownership assignment request 400 is logged into the disk ownership region 612 of the NVRAM 118 (see FIG. 6). Therefore, the fields in an ownership request 400 (as shown in FIG. 4) are the image elements (i.e., data) that are included in the disk ownership region 612.

Typically, the disk ownership layer 205 will first build an image (i.e., a copy) of the ownership assignment request 400 into a disk ownership region 612 in the memory (or buffer) 165 (FIG. 1), and disk ownership region 612 is then copied into the NVRAM 118 at the end of logging the request into NVRAM in step 325. Since access to an NVRAM is relatively not fast, the memory 165 is advantageously able to buffer the image of the request before the image is copied into the NVRAM. In other embodiments of the invention, the memory 165 is omitted and the image of the ownership assignment request is logged directly into a disk ownership region 612 in the NVRAM 118. The details of the disk ownership region 612 are discussed further below.

An image of every ownership assignment request is copied into the disk ownership region 612 in the NVRAM 118, so that the disk ownership layer 205 can rebuild every ownership assignment request during the replay process which is further discussed below with reference to FIG. 7. The replay process is carried out when there is a power failure, panic or crash, takeover, or other failure event that prevents a successful ownership change in a disk in a storage volume.

Referring back to FIG. 3, in step 330, when the ownership assignment request 400 is successfully logged in the disk ownership region 612 in the NVRAM 118, then the disk ownership layer 205 will set a valid flag 614 (FIG. 6) in the disk ownership region 612. The valid flag 614 indicates that a failure did not occur while the ownership assignment request was being logged into the disk ownership region 612 in the NVRAM 118. As a result, the data in the disk ownership region 612 is valid data.

If the valid flag 614 has been set, then in step 335, the disk ownership layer 205 (FIG. 2) will copy the disk ownership region 612 from the NVRAM 118 of the filer 130 via the link 160 to the NVRAM 175 in the second filer 135. In an embodiment, the filer 130 and the filer 135 belong to a same cluster of nodes. As an example, RDMA (Remote Direct Memory Access) technology is used to copy the disk ownership region 612 from the filer 130 to the second filer 135, although other suitable types of data transmission technology may be used as well. After step 335, the method 300 continues to FIG. 7.

Figure 7:
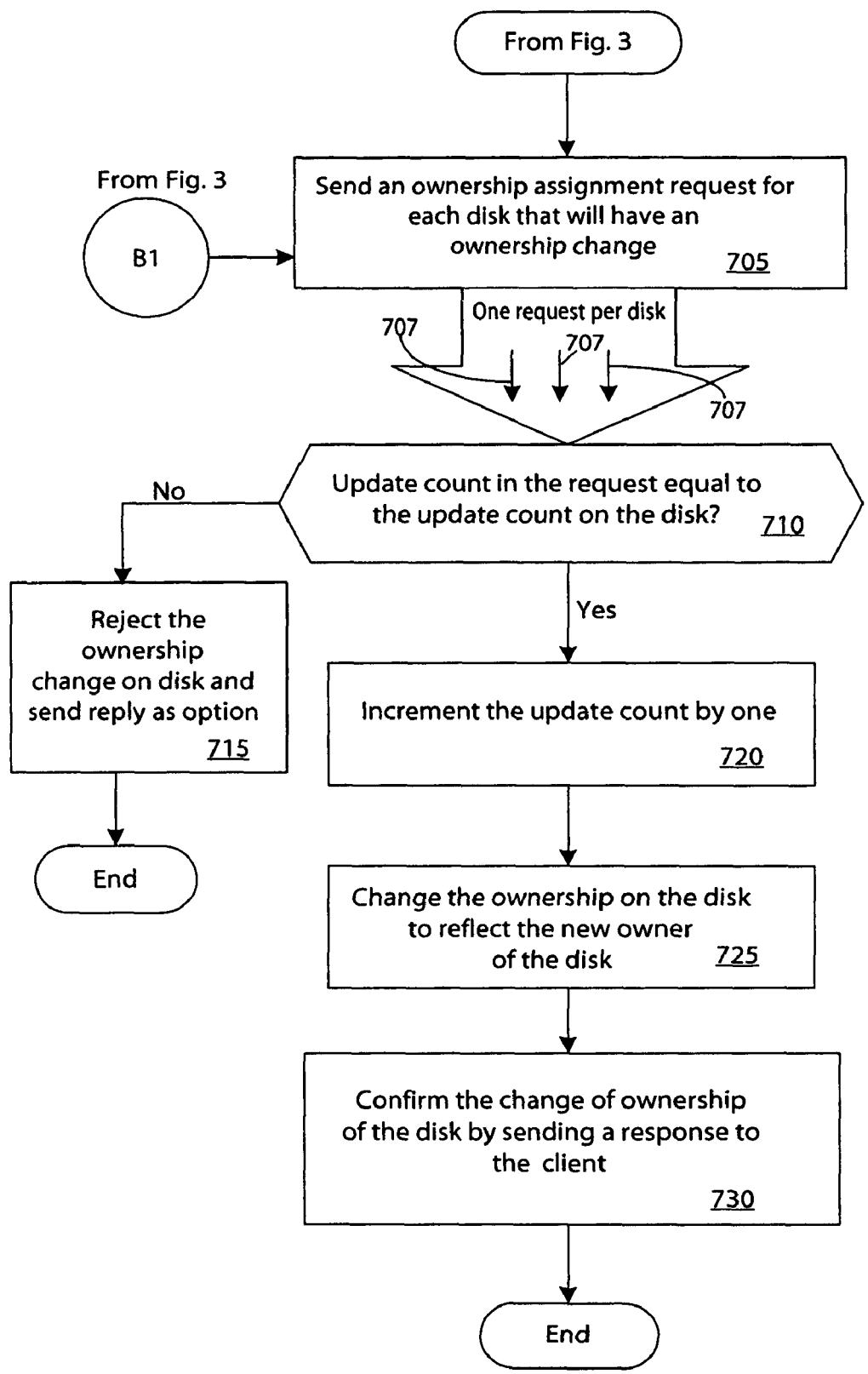
FIG. 7 is a flow diagram that shows additional steps of a method in accordance with an embodiment of the invention.

Referring now to FIG. 7, in step 305 (FIG. 3), the disk ownership layer 205 (FIG. 2) will receive from a client an original ownership assignment request 400 (FIG. 4) for each aggregate that will have an ownership change. This step 305 is similar to step 705 in FIG. 7. The original request 400 contains a list of all the disks in the storage volume (aggregate). From this list of disks, the disk ownership layer 205 breaks this request 400 into individual requests 707 (one request 707 per disk) that are sent to another component of the disk ownership layer 205. Each of these individual requests 707 then results in the actual ownership information being sent to the disk driver to be written to the physical disk. For example, in FIG. 1, if the disks 150-153 in the storage volume 0 will have an ownership change from Filer 130 (which is a current owner) to Filer 135 (which will be the new owner), then an ownership assignment request 707 will be sent for each of the disks 150-153.

In step 710, the disk ownership layer 205 (FIG. 2) checks if the update count in the ownership assignment request 707 is equal in value to the update count on the disk. If the update counts are not equal, then in step 715, the disk ownership layer 205 (FIG. 2) will reject the ownership change on the disk, and the disk will not be changed to another owner. Optionally, step 715 involves sending a response from the disk ownership layer 205 to the client 105, where the response indicates the ownership change rejection. As an example, if the update count 420 (FIG. 4) in a request 400 has a value of 7, while the update count 510 (FIG. 5) on the disk has a value of 8, then the update counts are not equal and the disk ownership will not be changed to another owner. Since the disk has a higher update count 510 value of 8, the disk has already been assigned to a new owner (e.g., second Filer 135) and no further ownership changes for the disk is necessary.

In step 710, if the update count in the request is equal in value to the update count in the disk, then in step 720, the disk ownership layer 205 (FIG. 2) will increment the update count 510 and write the ownership on the disk to reflect the new owner of the disk. As an example, if the update count 420 (FIG. 4) in a request 400 has a value of 7, while the update count 510 (FIG. 5) on the disk also has a value of 7, then the update counts are equal and the disk ownership layer 205 will be changed to the new owner. The updated count 510 is written to the disk as part of the ownership information. Since the update counts 420 and 510 are equal in value, the disk has not yet been assigned to a new owner (e.g., second Filer 135). Step 725 involves changing the ownership information 505 (FIG. 500) to reflect the ownership change of the disk from the current owner (e.g., Filer 130) to the new owner (e.g., second Filer 135). As known to those skilled in the art, a disk 500 can store other information such as, for example, disk content data 515 which may be folders, files, or other types of content.

In step 720, the disk ownership layer 205 (FIG. 2) will increment the update count 510 (FIG. 5) on the disk by one because the ownership of the disk is changed. Note that the incremented update count in step 720 is part of the information written to the disk in step 725.

In step 730, the disk ownership layer 205 (FIG. 2) will, as an optional step, confirm the change of ownership of the disk by sending a response to the client 105 (FIG. 1). Typically, a response is sent to the client 105 for every ownership assignment request that is sent from the client.

Figure 8:
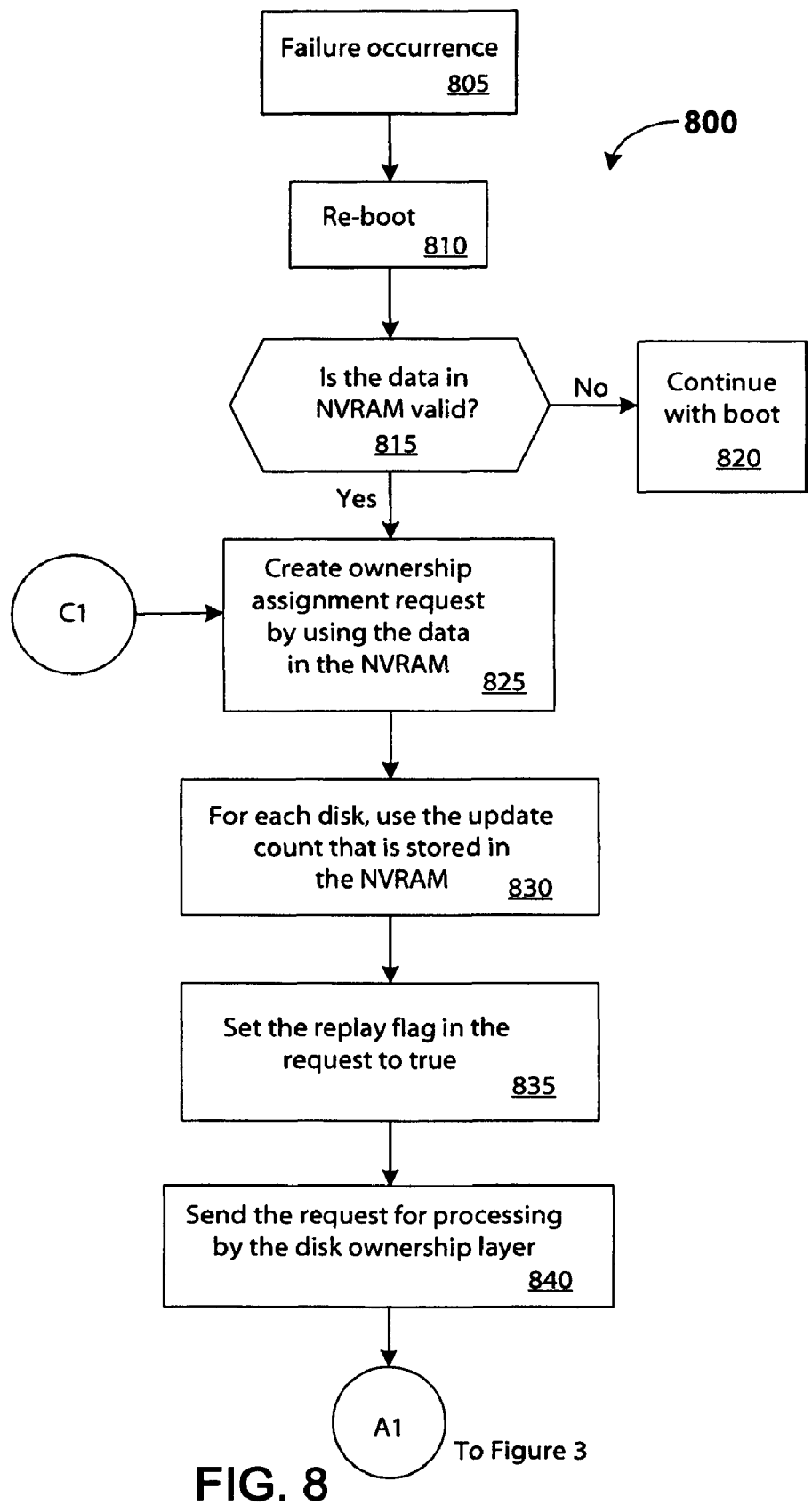
FIG. 8 is a flow diagram of a method for reliable disk ownership changes in response to a failure occurrence, in accordance with an embodiment of the invention.

FIG. 8 is a flow diagram of a method 800 for changing the ownership of disks if failure occurs in the system 100. As an example, a failure is when Filer 130 loses power or panic occurs in the Filer 130 so that an ownership change is not completed for one or more disks in a storage volume. In the example of FIG. 1, assume that failure in the system occurs while ownership is being changed for the disks in the storage volume 0. Due to the failure occurrence in step 805, assume that the disk ownership layer 205 (FIG. 2) is able to update the ownership of disks 150, disk 151 and disk 152 in order to reflect the new disk owner (Filer 135). However, due to the failure occurrence in step 805, the disk ownership layer 205 in not able to update the ownership of disk 153 to Filer 135. Instead, the disk 153 still contains the ownership information which indicates that disk 153 still belongs to Filer 130. This ownership information indicates the owner of the disk and may be written in, for example, the sector S of the disk. The ownership information may also optionally include the Small Computer System Interface (SCSI) level 3 persistent reservations which are described in SCSI Primary Commands—3, by Committee T10 of the National Committee for Information Technology Standards, which is incorporated fully herein by reference. By using SCSI-3 reservations, non-owning file servers are prevented from writing to a disk. However, the non-owning file servers can still read the ownership information from a predetermined location on the disk.

In step 815, the disk ownership layer 205 checks if the data (in the disk ownership region 612) in the NVRAM 118 is valid. When the valid flag 614 (FIG. 6) is set, then the data in the disk ownership region 612 in the NVRAM 118 is valid.

If the data in the NVRAM 118 is not valid (i.e., the valid flag 614 is not set), then in step 820, the method 800 will continue with the boot procedure. As known to those skilled in the art, a boot procedure is when software or firmware in a device is re-booted or when a device is re-started and software or firmware in the device is then re-booted.

On the other hand, if the data in the NVRAM 118 is valid, then in step 825, the disk ownership layer 205 creates an ownership assignment request 400 (FIG. 4) by using the data in the disk ownership region 612 (FIG. 6) in the NVRAM 118. This request 400 is the same request 400 as was originally received in step 305 except that the replay request flag 430 is set. For clarity of discussion herein, this request 400 is denoted as replay request 400' when the replay request flag 430 therein has been set. The disk ownership layer 205 can set the replay request flag 430. The set replay request flag 430 is also denoted as 640 in FIG. 6 for purposes of further clarity.

In step 830, for each disk that is to be assigned to the new owner, the disk ownership layer 205 (FIG. 2) will use the update count 630 (FIG. 6) that is stored in the disk ownership region 612 in the NVRAM 118, for the created ownership assignment request 400.

In step 835, the disk ownership layer 205 (FIG. 2) will set the replay flag 430 in the request 400 to true, in order to indicate that the request 400 is a replay request 400'.

In step 840, the created ownership assignment request (replay request) 400' is sent for processing by the disk ownership layer 205 (FIG. 2), as shown by step A1 which proceeds to FIG. 3.

As shown in step A1 to step 310 in FIG. 3, the disk ownership layer 205 (FIG. 2) determines if the created ownership assignment request 400' is a replay request. Since the created ownership assignment request 400' is a replay request (as identified by the set replay flag 430 in the request 400'), the method proceeds to step B1 which continues to FIG. 7. Therefore, for replay requests 400', the steps 315-335 are not performed.

As shown from step B1 to step 705 in FIG. 7, the created ownership assignment request (replay request) 400' contains a list of all the disks in an aggregate whose ownership was being changed. From this list of disks, the disk ownership layer 205 breaks this request 400' into individual requests 707 (one request 707 per disk) that are sent to another component of the disk ownership layer 205 for transmission to the appropriate disks.

As similarly discussed previously, in step 710, the value of the update count in a request is checked with the value of the update count in a disk. In the example of FIG. 1, the ownership has been updated to the new filer 135 for each of the disks 150, 151, and 152, while the ownership has not been updated to the new filer 135 (i.e., the ownership remains at the old filer 130) for the disk 153 due to the failure occurrence in step 805 (FIG. 8). Therefore, since the disks 150-152 have the updated ownership value, the update count in each of the disks 150-152 will have an incremented value (e.g., value 8). Since the disk 153 does not have the updated ownership value, the update count in the disk 153 does not have the incremented value (e.g., the update count is value 7 in disk 153). The update count 420 in the created ownership assignment request (replay request) 400' (FIG. 6) is value 7 in this example, since that update count 630 was copied from the NVRAM 118.

Since the update count of 8 in each of the disk 150-152 is greater than the update count 430 of 7 in the created ownership assignment request (replay request) 400', the ownership change will be rejected for disks 150-152. Therefore, the ownership remains at the new value (filer 135) for disks 150-152.

Since the update count in the disk 153 is equal to the update count 430 in the created ownership assignment request 400', the ownership in the disk 153 will be change to the new filer 135 to reflect the new owner of the disk 153, as indicated by step 725. Prior to writing the new ownership information the update count in the disk 153 will be incremented by one (i.e., from value 7 to value 8) in step 720, since the ownership information changed from filer 130 to filer 135.

As a result of step 725, each of the disks 150-153 in the storage volume 0 is now owned by the new owner (Filer 135).

Figure 9:
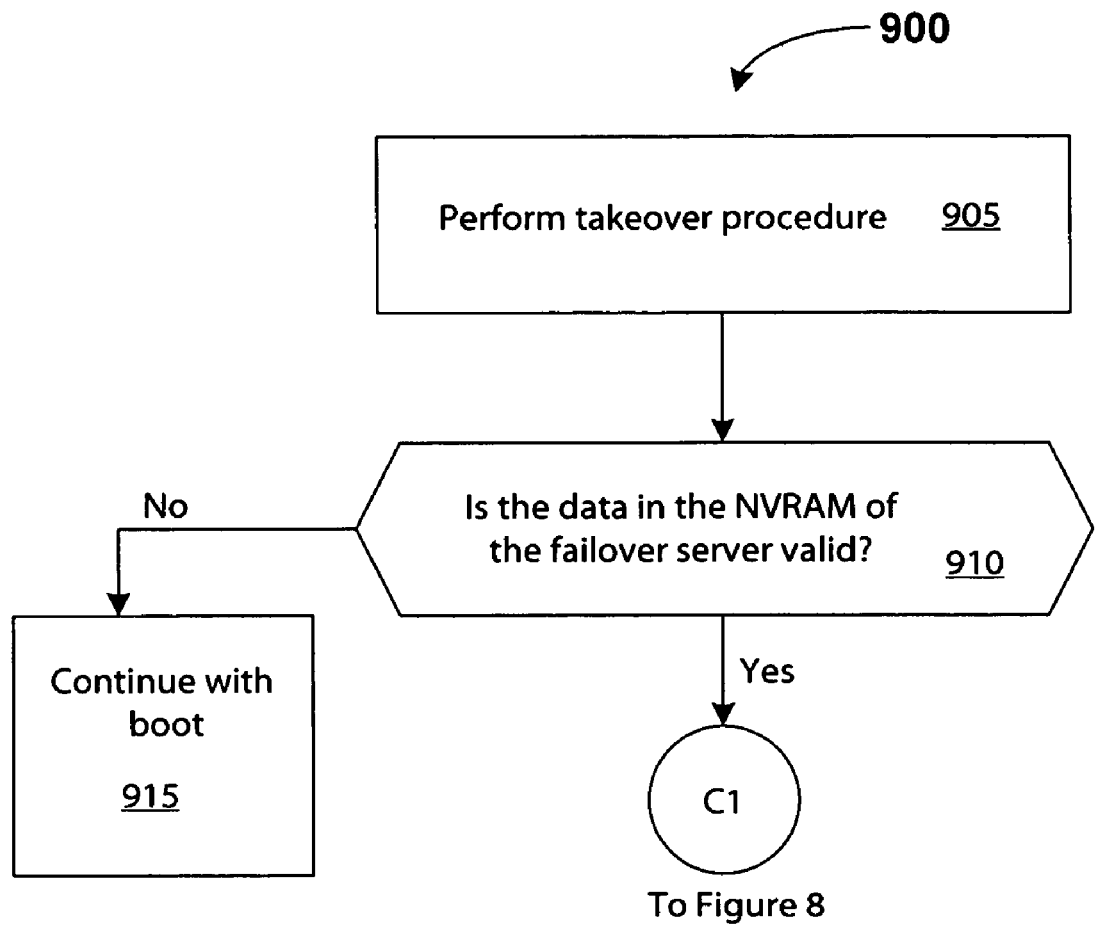
FIG. 9 is a flow diagram of a method for reliable disk ownership changes in response to a takeover procedure, in accordance with an embodiment of the invention.

FIG. 9 is a flow diagram of a method 900 for changing the ownership of disks if a takeover occurs in the system 100 during the ownership change process. In step 905, the takeover procedure is performed. As an example, in a takeover procedure, when the Filer 130 fails, the Filer 130 will failover to the Filer 135, and the Filer 135 will takeover the functions previously performed by the Filer 130. During the takeover procedure, the failover server (i.e., Filer 135 in this example) will check a list of entries in its resource table and perform calls to its different subsystems. Typically, the storage operating system 112 (FIG. 1) of the Filer 135 will perform the various calls to the Filer's 135 subsystems so that the failover procedure is performed. As mentioned above, a process in the OS 112 (or in other logical constructs) will typically perform the steps performed by the OS 112. The logical constructs are described herein as performing the steps for purposes of clarity.

The failover server will call for its disk system to take over the disks of the failed server. The failover server will call its RAID system to assimilate those disks into aggregates (e.g., storage volumes). The failover server will also call its WAFL system to mount the file system. Calls will also be made to the networking system to initiate network operation and to the protocol system to start use of the protocol for transmitting data across the network that connects the failed server and failover server. Those skilled in the art will realize that other known steps may be performed during the failover procedure. Therefore, the failover server will use the resource table to bring up the data that was previously managed by the failed server and to perform services that were previously performed by the failed server.

The failover Filer 135 will also include an NVRAM 175 that contains a copy of the disk ownership region 612 that is also stored in the NVRAM 118 of the failed Filer 130. As previously discussed above in step 335 in FIG. 3, the disk ownership region 612 is copied from the NVRAM 118 (if it is valid) to the disk ownership region 612 in NVRAM 175. The disk ownership region 612 may optionally be copied to a memory (or buffer) 170 in the failover Filer 135 prior to copying of the region 612 into NVRAM 175. In other embodiments of the invention, the memory 170 is omitted in the failover Filer 135.

In step 910, the disk ownership layer in the failover Filer 135 checks if the data (in disk ownership region 612) in its NVRAM 175 is valid. When the valid flag 614 (FIG. 6) is set, then the data in the disk ownership region of NVRAM 175 is valid.

If the data in the NVRAM 175 is not valid (i.e., the valid flag 614) is not set, then in step 915, the method 900 will continue with the boot procedure.

On the other hand, if the data in the NVRAM 175 is valid, then in step 910, the method 900 proceeds to step C1 in FIG. 8. In FIG. 8, from step C1 to step 825, the disk ownership layer in the failover Filer 135 creates an ownership assignment request (e.g., replay request 400' in FIG. 6) by using the data in the disk ownership region 612 (FIG. 6) in the NVRAM 175.

In step 830, for each disk that is to be assigned to the new owner, the disk ownership layer in the failover Filer 135 will use the update count 630 (FIG. 6) that is stored in the table disk ownership region 612 in the NVRAM 175, for the created ownership assignment request 400'.

In step 835, the disk ownership layer in will set the replay flag 430 in the request 400 to true, in order to indicate that the request 400' is a replay request.

In step 840, the created ownership assignment request 400' is sent for processing by the disk ownership layer in the failover Filer 135, as shown by step A1 which proceeds to FIG. 3.

As shown in step A1 to step 310 in FIG. 3, the disk ownership layer in the failover Filer 135 determines if the created ownership assignment request 400' is a replay request. Since the created ownership assignment request 400' is a replay request (as identified by the set replay flag 430 in the request 400'), the method proceeds to step B1 which proceeds to FIG. 7.

As shown from step B1 to step 705 in FIG. 7, the created ownership assignment request (replay request) 400' contains a list of all the disks in an aggregate whose ownership was being changed. From this list of disks, the disk ownership layer 205 breaks this request 400' into individual requests 707 (one request 707 per disk) that are sent to another component of the disk ownership layer 205 for transmission to the appropriate disks.

As similarly discussed previously, in step 710, the value of the update count in a replay request is checked with the value of the update count on a disk. In the example of FIG. 1, the ownership has been updated to the new filer 135 for each of the disks 150, 151, and 152, while the ownership has not been updated to the new filer 135 (i.e., the ownership remains at filer 130) for the disk 153 due to the failover occurrence in step 905 (FIG. 9). Therefore, since the disks 150-152 have the updated ownership value (filer 135), the update count in each of the disks 150-152 will have an incremented value (e.g., value 8). Since the disk 152 does not have the updated ownership value (remains at filer 130), the update count in the disk 153 does not have the incremented value (e.g., the update count is value 7 in disk 153). The update count 430 in the created ownership assignment request (replay request) 400' (FIG. 6) is value 7 in this example.

Since the update count of 8 in each of the disk 150-152 is greater than the update count 430 of 7 in the created ownership assignment request (replay request) 400', the ownership change will be rejected for disks 150-152. Therefore, the ownership remains at the new value (filer 135) for disks 150-152.

Since the update count in the disk 153 is equal to the update count 430 in the created ownership assignment request (replay request) 400', the ownership in the disk 153 will be changed to reflect the new owner (filer 135) of the disk 153, as indicated by step 725 after the update count in the disk 153 has been incremented by one (i.e., from value 7 to value 8) in step 720, since the ownership information changed from filer 130 to filer 135.

As a result of step 725, each of the disk 150-153 in the storage volume 0 is now owned by the new owner (Filer 135).

As discussed above, note that the owner of the storage aggregate might be being changed to a new owner node (e.g., filer 135) at, for example, takeover time in a shared failover environment or aggregate migration time in a shared storage configuration. If a fault/failure occurs during the ownership change steps at takeover time or aggregate migration time, an embodiment of the invention provides a method that changes the ownership of the set of disks (in the storage aggregate) to the new owner node or alternatively the ownership will not be changed at all. As also discussed above, an embodiment of the invention logs (stores) the ownership changes to a persistent memory device 118 (e.g., NVRAM) and replays the ownership change requests after a power failure or panic/reboot. On cluster configurations, the logged ownership changes are mirrored across the cluster interconnect 160 from a failed node (e.g., node 130) to the failover node (e.g., node 135), and ownership change requests are replayed (via replay requests) after the takeover procedure is performed.

FIG. 4 is a block diagram of an example ownership assignment request 400, in accordance with an embodiment of the invention. A request 400 typically includes an identifier 405 of a new owner, a name 410 of a new owner, an identifier 415 of each disk to be assigned to the new owner, an update count 420, an identifier 425 of a disk pool (used for fault isolation), and a replay request flag 430 in the request 400. The ownership assignment request 400 will have one instance of disk identifier 415, update count 420, and disk pool 425 for each disk whose ownership is being changed.

FIG. 6 is a block diagram illustrating additional details of the data in the NVRAM 118 including the disk ownership region 612, in accordance with an embodiment of the invention. The RAID region 610 contains persistent information used by the RAID subsystem after a failure/takeover. The WAFL region 605 contains persistent information used by the WAFL (Write Anywhere File Layout) subsystem after a failure/takeover.

Images of each ownership assignment request is also stored in the disk ownership region 612, including an identifier 615 of a new owner, a name 620 of a new owner, an identifier 625 of each disk to be assigned to the new owner, an update count 630 copied from each ownership assignment request, an identifier 635 of a disk pool (used for failure isolation), and a replay request flag 640 copied from each ownership assignment request. Note that one instance of blocks 625, 630, and 635 are assigned per each disk.

It is also within the scope of an embodiment of the present invention to implement a program or code that can be stored in a machine-readable medium to permit a computer to perform any of the methods described above.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method for reliable disk ownership changes, the method comprising:
   in response to a failure occurrence when ownership is being changed for disks in an aggregate, generating a replay request based on ownership data stored in a persistent memory device;
   comparing an update count in the replay request with an update count in a disk in the aggregate, wherein the update count in the disk is a counter value; and
   based on the comparison of the update counts, changing the ownership on the disk so that each disk in the aggregate will be owned by a same node.

2. The method of claim 1, wherein the replay request is a disk ownership change request that is transmitted to a disk after occurrence of a failure or takeover when ownership is being changed for a disk in the aggregate.

3. The method of claim 1, further comprising: transmitting an original ownership assignment request prior to the failure occurrence, wherein the update count in the replay request is equal to an update count in the original ownership assignment request.

4. The method of claim 1, further comprising: generating an additional replay request for each remaining disk in the aggregate;
   comparing an update count in the additional replay request with an update count in a remaining disk in the aggregate; and
   based on the comparison of the update counts, changing the ownership on the remaining disk so that each disk in the aggregate will be owned by a same node.

5. The method of claim 1, wherein the failure occurrence comprises one of a power failure, a panic occurrence, or a takeover procedure.

6. The method of claim 1, wherein the ownership on the disk is changed if the update counts are equal in value.

7. The method of claim 1, wherein the ownership on the disk is not changed if the update counts are not equal in value.

8. The method of claim 1, wherein the update count on the disk is incremented in conjunction with changing the ownership of the disk.

9. The method of claim 1, further comprising:
   sending a response to a client if the ownership of a disk is changed.

10. The method of claim 1, further comprising:
    sending a response to a client if the ownership of a disk is not changed.

11. The method of claim 1, wherein the replay request is formed from data in the persistent memory in a first filer when failure occurs in the first filer and if the data is valid.

12. The method of claim 1, further comprising: storing an original ownership assignment request into the persistent memory device, where the original request is directed to change an ownership of a disk.

13. The method of claim 12, wherein the original ownership assignment request is stored in a buffer prior to storing the original request in the persistent memory device.

14. The method of claim 12, wherein the replay request is formed by the contents of the original ownership assignment request and wherein a replay request flag is set in the replay request.

15. The method of claim 12, wherein the original ownership assignment request is stored in a disk ownership region in the persistent memory device.

16. The method of claim 9, wherein the disk ownership region is copied to the second filer if the disk ownership region is valid.

17. The method of claim 12, wherein the disk ownership region is copied from a first filer to a second filer across a link.

18. The method of claim 17, wherein the replay request is formed from data in the second filer, if the first filer fails and the second filer is a failover filer.

19. The method of claim 18, wherein the replay request is formed from data in the second filer if the data is valid.

20. An apparatus for reliable disk ownership changes, the apparatus comprising:
a client;
a first filer;
a second filer; and
a network that connects the client to the first filer and to the second filer;
wherein the first filer generates a replay request based on ownership data stored in a persistent memory device, in response to a failure occurrence when ownership is being changed for disks in an aggregate; wherein the first filer compares an update count in the replay request with an update count in a disk in the aggregate, wherein the update count in the disk is a counter value; and wherein the first filer changes the ownership on the disk so that each disk in the aggregate will be owned by a same node, based on the comparison of the update counts.

21. The apparatus of claim 20, wherein the replay request is a disk ownership change request that is transmitted to a disk after occurrence of a failure or takeover when ownership is being changed for a disk in the aggregate.

22. The apparatus of claim 20, wherein an original ownership assignment request is transmitted prior to the failure occurrence, and wherein the update count in the replay request is equal to an update count in the original ownership assignment request.

23. The apparatus of claim 20, wherein the first filer generates an additional replay request for each remaining disk in the aggregate, compares an update count in the additional replay request with an update count in a remaining disk in the aggregate, and based on the comparison of the update counts, changes the ownership on the remaining disk so that each disk in the aggregate will be owned by a same node.

24. The apparatus of claim 20, wherein the failure occurrence comprises one of a power failure, a panic occurrence, or a takeover procedure.

25. The apparatus of claim 20, wherein the ownership on the disk is changed if the update counts are equal in value.

26. The apparatus of claim 20, wherein the ownership on the disk is not changed if the update counts are not equal in value.

27. The apparatus of claim 20, wherein the first filer increments the update count on the disk in conjunction with changing the ownership of the disk.

28. The apparatus of claim 20, wherein the first filer sends a response to the client if the ownership of a disk is changed.

29. The apparatus of claim 20, wherein the first filer sends a response to a client if the ownership of a disk is not changed.

30. The apparatus of claim 20, wherein first filer forms the replay request from data in the persistent memory in the first filer when failure occurs in the first filer and if the data is valid.

31. The apparatus of claim 20, wherein the first filer stores an original ownership assignment request into the persistent memory device, where the original request is directed to change an ownership of a disk.

32. The apparatus of claim 31, wherein the first filer stores the original ownership assignment request in a buffer prior to storing the original request in the persistent memory device.

33. The apparatus of claim 31, wherein the first filer forms the replay request by the contents of the original ownership assignment request and wherein the first filer sets a replay request flag in the replay request.

34. The apparatus of claim 31, wherein the first filer stores the original request in a disk ownership region in the persistent memory device.

35. The apparatus of claim 34, wherein the first filer copies the disk ownership region to the second filer across a link.

36. The apparatus of claim 34, wherein the first filer copies the disk ownership region to the second filer if the disk ownership region is valid.

37. The apparatus of claim 20, wherein the second filer forms the replay request from data in the second filer, if the first filer fails and the second filer is a failover filer.

38. The apparatus of claim 37, wherein the second filer forms the replay request from data in the second filer if the data is valid.

39. An article of manufacture, comprising:
a machine-readable medium having stored thereon instructions which, when executed by a processor, cause the processor to:
generate a replay request based on ownership data stored in a persistent memory device in response to a failure occurrence when ownership is being changed for disks in an aggregate;
compare an update count in the replay request with an update count in a disk in the aggregate, wherein the update count in the disk is a counter value; and
change the ownership on the disk so that each disk in the aggregate will be owned by a same node, based on the comparison of the update counts.

40. The article of manufacture of claim 39 wherein the replay request is a disk ownership change request that is transmitted to a disk after occurrence of a failure or takeover when ownership is being changed for a disk in the aggregate.

41. A network storage server comprising:
a network interface through which to communicate with a storage client;
a storage interface through which to communicate with a set of storage devices;
a non-volatile storage device; and
a processor coupled to the network interface, the storage interface, and the non-volatile storage device, and configured to perform operations which include:
responding to an event that prevents successful completion of a change in ownership for at least one of the storage devices in the set, by generating a replay request based on ownership data stored in the non-volatile storage device;
comparing an update count in the replay request with an update count in a storage device in the set, wherein the update count in the storage device is a counter value; and
based on the comparison of the update counts, setting the ownership on the storage device in the set.

42. The network storage server of claim 41, wherein setting the ownership on the storage device in the set comprises setting the ownership on the storage device in the set so that each storage device in the set will be owned by a same node.

43. The network storage server of claim 41, wherein the event is a failure event or a takeover event.

44. The network storage server of claim 41, wherein the replay request is a replay of an original disk ownership assignment request.

45. The network storage server of claim 44, wherein the processor further is configured to transmit the original ownership assignment request prior to the event, wherein the update count in the replay request is equal to an update count in the original ownership assignment request.

46. The network storage server of claim 44, wherein the processor is configured to generate the replay request from contents of the original ownership assignment request as stored in the non-volatile storage device.

* * * * *